United States Patent [19]
Zhang

[11] Patent Number: 5,805,754
[45] Date of Patent: Sep. 8, 1998

[54] GRADED REFRACTIVE INDEX OPTICAL WAVEGUIDE USING A FLUID MEDIUM

[75] Inventor: Yong Fang Zhang, Mill Creek, Wash.

[73] Assignee: Synrad, Inc., Mukilteo, Wash.

[21] Appl. No.: 787,801

[22] Filed: Jan. 23, 1997

[51] Int. Cl.⁶ .............................. G02B 6/18; G02B 6/20
[52] U.S. Cl. ............................................ 385/125; 385/124
[58] Field of Search .................................. 385/123, 124, 385/125

[56] References Cited

U.S. PATENT DOCUMENTS

| | | | |
|---|---|---|---|
| 3,415,588 | 12/1968 | Berreman | 385/125 |
| 3,441,337 | 4/1969 | Miller | 385/125 |
| 3,841,731 | 10/1974 | Midwinter | 385/125 |
| 4,185,889 | 1/1980 | Marié et al. | 385/125 |
| 4,685,766 | 8/1987 | Nishimura et al. | 385/125 |

OTHER PUBLICATIONS

Saleh, B.E.A., and M.C. Teich, *Fundamentals of Photonics*, John Wiley & Sons, Inc., New York, [No Month] 1991, pp. 18–25, 272–309.

*Primary Examiner*—John D. Lee
*Attorney, Agent, or Firm*—Seed and Berry LLP

[57] ABSTRACT

An optical waveguide and method for guiding a laser beam through a channel member having a fluid medium disposed therein. A refractive index gradient is created in the fluid medium which causes the fluid medium to guide the laser beam through the channel member. The refractive index gradient results when a temperature index gradient is created in the fluid medium by heating the channel member wall. The channel member can be externally heated using a separate heating source or the channel member can be heated from the inside by the laser beam itself. A fluid pump is used to create a fluid flow in the fluid medium in order to maintain the temperature and refractive index gradients in the fluid medium.

23 Claims, 2 Drawing Sheets

GRADED REFRACTIVE INDEX OPTICAL WAVEGUIDE USING A FLUID MEDIUM

TECHNICAL FIELD

The present invention relates to lasers and, more particularly, to optical waveguides for laser delivery.

BACKGROUND OF THE INVENTION

Optical fibers are widely used in the communications field to transmit laser beams over great distances. Optical fibers are replacing copper coaxial cables as the preferred transmission medium for many electromagnetic waves, thereby revolutionizing terrestrial communications. Applications range from long-distance telephone and data communications to computer communications in a network.

An optical fiber is a solid cylindrical, dielectric waveguide made of low-loss materials such as silica glass. The optical fiber has a central core positioned coaxially within an outer cladding having a refractive index that is lower than the refractive index of the core. Light rays of the laser beam striking the core/cladding boundary at angles greater than a critical angle undergo total internal reflection and are guided through the core without refraction. Light rays of the laser beam striking the core/cladding boundary at angles less than the critical angle lose part of their power into the cladding, and thus, are not guided.

Silica fibers are transparent only in the wavelength range from visible to near infrared. Other fibers have been developed for transmitting optical power in other wavelengths, including hollow glass waveguide optical fibers and other solid fibers. Hollow glass waveguide optical fibers rely on mirror reflection from the smooth optical coating on its inside wall to guide the optical wave. Any failure of the inside coating will cause catastrophic failures because the tubing itself is usually absorptive and easily damaged by the laser beam. Other solid fibers include chalcogenide glass fibers and halide polycrystalline fibers. These solid state material fibers have a medium amount of absorption, and are therefore limited in power delivery capability.

Industrial laser applications require intensity modulation or switching of the working laser beam. This modulation and switching usually involves mechanical, acousto-optic or electro-optic means. Mechanical means can handle high power, but are relatively slow. Acousto-optic and electro-optic means are faster, but involve crystals that have limited range in wavelength and power handling capabilities.

SUMMARY OF THE INVENTION

The present invention is directed to an optical waveguide and a method for guiding a laser beam. The optical waveguide includes a channel member that encloses a channel within which a fluid medium is disposed. The fluid medium has a refractive index gradient ranging from a low refractive index immediately adjacent a wall of the channel member to a high refractive index away from the channel member wall. The refractive index gradient is sufficient to enable the fluid medium to guide the laser beam through the channel member.

In a preferred embodiment, the refractive index gradient is established in the fluid medium in the channel by heating the channel member sufficiently to create a temperature gradient in the fluid medium with the hottest area nearest to the channel member wall. The temperature gradient results in a density gradient with the hottest area nearest to the channel member wall having the lowest density and the coolest area near the center of the channel having the highest density. Given that the refractive index of a fluid is directly proportional to its density, the temperature gradient in the fluid medium results in a refractive index gradient that enables the fluid medium to guide the laser beam. The temperature gradient can be produced by an external heat source or by the laser beam itself if the interior surface of the channel member wall is optically absorbent. Alternatively, any other method for creating a density gradient, in the fluid medium likewise will produce a refractive index gradient, such as a pressure wave, that enables the fluid medium to guide the laser beam.

In the preferred embodiment, the fluid medium within the channel is refreshed with new fluid in order to maintain the desired temperature gradient. New fluid is introduced into the channel through a fluid input port in the channel member by a fluid pump. The channel member also includes a fluid output port through which the fluid medium is expelled from the channel in order to refresh the fluid medium. Preferably, the new fluid is introduced in a manner that maintains laminar flow of the fluid medium to achieve a high refractive index gradient and maintain the mode quality of the laser.

The optical waveguide also preferably includes a controller that selectively establishes and removes the refractive index gradient in order to selectively enable and prevent the guiding of the laser beam through the channel member. In one embodiment, the controller is a fluid controller that is coupled to the fluid pump and is structured to selectively restrict and enable the fluid medium to flow into the channel through the fluid input port. The fluid controller selectively restricts the fluid flow long enough to reduce the temperature gradient within the channel sufficiently to prevent the fluid medium from guiding the laser beam. The fluid controller also selectively enables the fluid flow long enough to increase the temperature gradient, and the resulting refractive index gradient, sufficiently to enable the fluid medium to guide the laser beam. Alternatively, the controller can selectively establish and remove the temperature and refractive index gradients by selectively turning ON and OFF an external heat source coupled to the channel member.

In yet another embodiment, the optical waveguide is operated in a self-guiding mode in which the laser beam itself is the heat source that heats the channel member wall sufficiently to produce the temperature gradient and the resulting refractive index gradient. In this embodiment, an optically absorbent tube material is used for the channel member so that the channel member wall will be heated up by application of the laser beam. The increase in temperature of the channel member wall produces temperature and refractive index gradients sufficient to enable the fluid medium to guide the laser beam. Such a self-guided optical waveguide can be operated in either a stable mode or an unstable mode. In the stable mode, the high order modes of the laser beam are used to keep the channel member wall heated while the lower order modes are guided by the refractive index gradient caused by the heating of the channel member wall. In the unstable mode, the laser beam is oscillated by enabling the channel member wall to cool sufficiently to stop the laser beam from being transmitted until the laser beam heats up the channel member wall again sufficiently to produce the refractive index gradient that guides the laser beam.

DETAILED DESCRIPTION OF THE INVENTION

Figure 1:
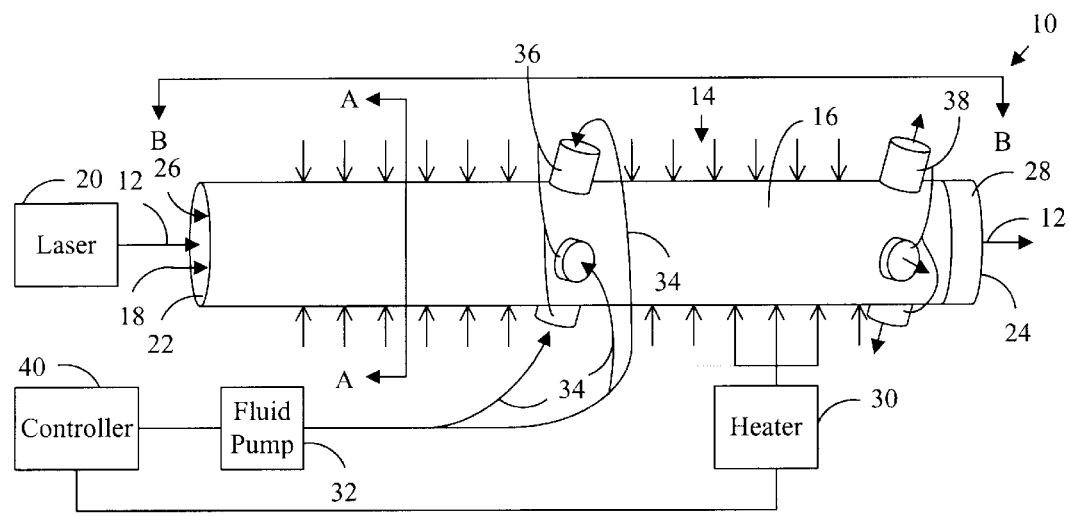
FIG. 1 is a schematic diagram of a system for guiding a laser beam through a fluid medium according to the present invention.

A first embodiment of an optical waveguide 10 for delivery of a laser beam 12 according to the present invention is shown in FIG. 1. The optical waveguide 10 includes a hollow channel member 14 with a channel member wall 16 enclosing a channel 18 through which the laser beam 12 is directed from a laser 20. The channel member 14 shown in FIG. 1 is an elongated cylindrical tube extending from a laser input port 22 to a laser output port 24. Disposed within the channel 18 is a fluid medium 26 through which the laser beam 12 is guided from the laser input port 22 to the laser output port 24. The channel member 14 can be composed of numerous solid materials, such as steel, silica, ceramic, and nylon. The fluid medium 26 can be any suitable liquid or gas such as air, xenon, carbon dioxide, nitrogen, or a mixture of such materials. Preferably, coupled to the laser output port 24 is a substantially transparent, anti-reflective optical window 28 through which the laser beam 12 exits the channel member 14.

The optical waveguide 10 guides the laser beam 12 through the channel 18 in the channel member 14 by creating a refractive index gradient in the fluid medium 26. The refractive index gradient ranges from a low refractive index immediately adjacent to the channel member wall 16 to a high refractive index in the center of the channel 18. The refractive index gradient is sufficient to enable the fluid medium 26 to guide the laser beam 12 through the channel 18. Such guiding is similar to the manner in which the air immediately adjacent a paved road in hot weather acts like a mirror to efficiently reflect light from the road. Employing the fluid medium 26 enables the optical waveguide 10 to guide laser beams having wavelengths in the ultraviolet and far infrared regions, where there is not a good selection of solid-state guiding materials with the desired optical and mechanical properties. Moreover, the fluid medium 26 enables the optical waveguide 10 to guide laser beams with higher power (e.g., greater than 100 watts/cm$^2$) than prior art solid optical fibers.

In the preferred embodiment shown in FIG. 1, the refractive index gradient is created by creating a transverse temperature gradient within the fluid medium 26 between the fluid medium immediately adjacent to the channel member wall 16 and the fluid medium at the center of the channel 18. The temperature gradient is created by heating the channel member wall 16 using a heater 30. Preferably, the heat from the heater 30 is applied uniformly substantially along the entire length of the channel member wall 16. The temperature gradient results in a density gradient in which the hottest area nearest to the channel member wall 16 has the lowest density and the coolest area near the center of the channel 18 has the highest density. Given that the refractive index of a fluid is directly proportional to its density, the temperature gradient in the fluid medium 26 results in the desired refractive index gradient that enables the fluid medium to guide the laser beam 12.

The optical waveguide 10 also includes a fluid pump 32 coupled via fluid lines 34 to fluid input ports 36 in the channel member wall 16. The fluid pump 32 directs fluid medium 26 into the channel 18 via the fluid lines 34 and the fluid input ports 36. The flow of the fluid medium 26 from the fluid pump 32 into and through the channel 18 helps to maintain the temperature gradient and thereby maintain the refractive index gradient that enables the fluid medium to guide the laser beam 12 through the channel 18. Fluid output ports 38 are also provided in the channel member wall 16 to enable the fluid medium 26 to exit the channel 18. The heater 30 and fluid pump 32 are coupled to a computer controller 40 that controls the amount of heat imparted to the channel member wall 16 by the heater 30 and the amount of fluid directed into the channel 18 by the fluid pump 32.

It should be appreciated that the channel member 14 need not be limited to the cylindrical shape shown in FIG. 1. That is, the channel member 14 could have a rectangular, triangular, or any other cross section that allows a refractive index gradient to be created in the fluid medium 26 located within the channel member. In addition, the channel member 14 can curve around corners without destroying the ability of the fluid medium 26 to guide the laser beam 12.

Figure 2:
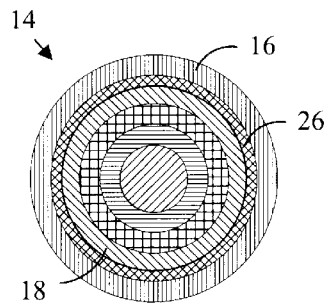
FIG. 2 is a cross-sectional view of the optical waveguide taken along line AA of FIG. 1 showing a temperature gradient of the fluid medium within the optical waveguide.

A transverse cross-sectional view of the channel member 14, taken along line A—A of FIG. 1 is shown in FIG. 2. In FIG. 2 the fluid medium 26 is shaded according to temperature such that the temperature of the fluid medium varies from a relatively low temperature with lighter shading adjacent the channel member wall 16 to a relatively high temperature with darker shading at the center of the channel 18. Thus, FIG. 2 shows that a portion of the fluid medium 26 immediately adjacent the channel member wall 16 is hotter than the portion of the fluid medium 26 at the center of the channel 18 within the channel member 14.

Figure 3:
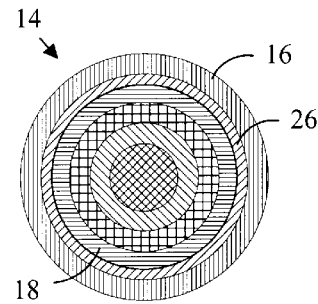
FIG. 3 is a cross-sectional view of the optical waveguide taken along line AA of FIG. 1 showing a refractive index gradient of the fluid medium within the optical waveguide.

FIG. 3 is a transverse cross-sectional view of the channel member 14 that is identical to the cross-sectional view shown in FIG. 2 except that FIG. 3 shows the refractive index gradient caused by the temperature gradient illustrated in FIG. 2. In FIG. 3 the refractive index of the fluid medium 26 varies from a low value immediately adjacent the channel member wall 16 to a relatively high value along the center of the channel 18. Such a refractive index gradient enables the fluid medium 26 to guide the laser beam 12 through the channel 18 of the channel member 14. With a sufficient refractive index gradient, only the weak tails of the evanescent wave of the laser beam 12 are immediately adjacent to the channel member wall 16. As a result, the optical property of the channel member wall 16, as well as its surface finish, is non-critical to the guiding ability of the fluid medium 26 within the channel member 14.

Figure 4:
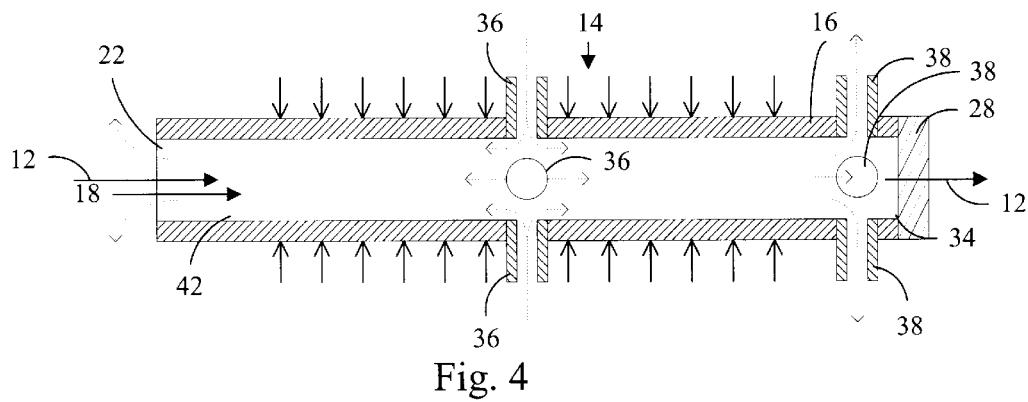
FIG. 4 is a longitudinal cross-sectional view of the optical waveguide taken along line BB of FIG. 1.

A longitudinal cross section of the channel member 14, taken along line B—B of FIG. 1 is shown in FIG. 4. The laser beam 12 enters the channel 18 through the laser input port 22 and is guided by the fluid medium 26 until the laser beam exits the channel 18 through the optical window 28 and the laser output port 24. Preferably the fluid input ports 36 and fluid output ports 38 are arranged to cause laminar flow in the fluid medium 26 from the fluid input ports to the fluid output ports. The fluid input ports 36 are evenly circumferentially distributed about the channel member wall 16, and as shown in FIG. 4, the fluid input ports 36 are positioned directly across from one another so that the fluid flows from the fluid input ports counter each other and then the fluid medium 26 flows laminarly toward the fluid output ports 38. Similarly, the fluid output ports 38 are evenly circumferentially distributed about the channel member 16, and are positioned directly across from one another with the same arrangement and orientation as the fluid input ports 36. The laminar flow that results enables the fluid medium 26 to maintain the desired temperature and refractive index gradients more effectively than would be practicable if the fluid medium flowed in a turbulent manner.

In the embodiment of FIG. 4, the channel member wall 16 has an inner surface 42 that is substantially reflective to prevent the channel member wall from being overheated by the laser beam 12, especially where the laser beam power is high, e.g., greater than 100 watts/cm$^2$. Such a reflective inner surface 42 can be provided simply by employing a highly polished channel member wall 16. Alternatively, the channel member wall can be made of highly absorptive materials, such as commercially available plastic hoses, with a reflective layer being coated on the inner surface 42 to avoid damage to the tubing.

Figure 5:
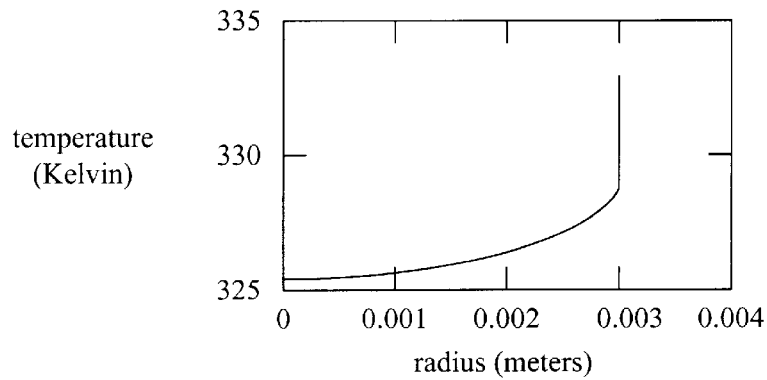
FIG. 5 is a graph showing the temperature gradient of the fluid medium within the optical waveguide of FIG. 1.

A graph showing the temperature gradient of the fluid medium 26 within the channel member 14 is shown in FIG. 5. The graph of FIG. 5 was created based on a fluid medium that includes air, carbon dioxide, and xenon gases initially at room temperature and atmospheric pressure. In addition, the channel member 14 used had an inside diameter of 6 mm. After applying heat to the channel member wall 16 for 0.4 seconds, a 3–4 degree temperature gradient was established between the center of the channel member (0 mm radius) and a point immediately adjacent the channel member wall 16 (3 mm radius). The large jump in temperature at the channel member wall 16 (3 mm radius) shows the limited convection heat transfer from the channel member 14 to the fluid medium 26. Experiments have shown that a 2 to 4 degree temperature gradient can be maintained inside channel members having inside diameters of 3 to 10 mm. Such channel member diameters and temperature gradients are suitable for guiding a singlemode laser beam having a wavelength of 10.6 µm.

In contrast to prior art solid optical fibers, the optical waveguide 10 can be operated to dynamically modulate the laser beam 12 by altering the refractive index gradient through pressure or temperature changes. For example, the flow of the fluid medium 26 through the channel 18 can be stopped by turning off the fluid pump 32 or closing the fluid ports 36, 38, which causes the temperature in the fluid medium 26 to reach equilibrium and thereby destroys the refractive index gradient. Without the refractive index gradient, the fluid medium 26 no longer guides the laser beam 12 and the channel member 14 simply absorbs the laser beam 12. The speed of modulation is governed by the speed of sound in the fluid medium. The ability to dynamically modulate the optical waveguide 10 to guide the laser beam 12 enables the optical waveguide to be employed as a switching device or an amplitude modulator. Further, in contrast to prior art acousto-optic and electro-optic modulation devices, the optical waveguide 10 can be employed to handle high power laser beams (e.g. greater than 100 watts/cm$^2$) without much less because the guiding medium is a gas or liquid.

Rather than turning on and off the flow of the fluid medium 26, a similar switching effect can be achieved by turning the heater 30 on and off. When the heater 30 is turned off, the fluid medium 26 cools down until the temperature and refractive index gradients are destroyed, which disables the guiding ability of the optical waveguide 10. If the heater 30 is turned on for a time period that is sufficiently short so that the fluid medium does not reach thermal equilibrium and the time in which the heater 30 is turned off is long enough for the fluid medium 26 to cool down, the optical waveguide 10 can operate without gas flow from the fluid pump 32 through the fluid ports 36, 38. If the channel member 14 is small enough (e.g., 3 mm diameter), then the laser beam 12 can be switched on and off at high frequencies because the fluid medium 26 heats up and cools off more quickly.

Figure 6:
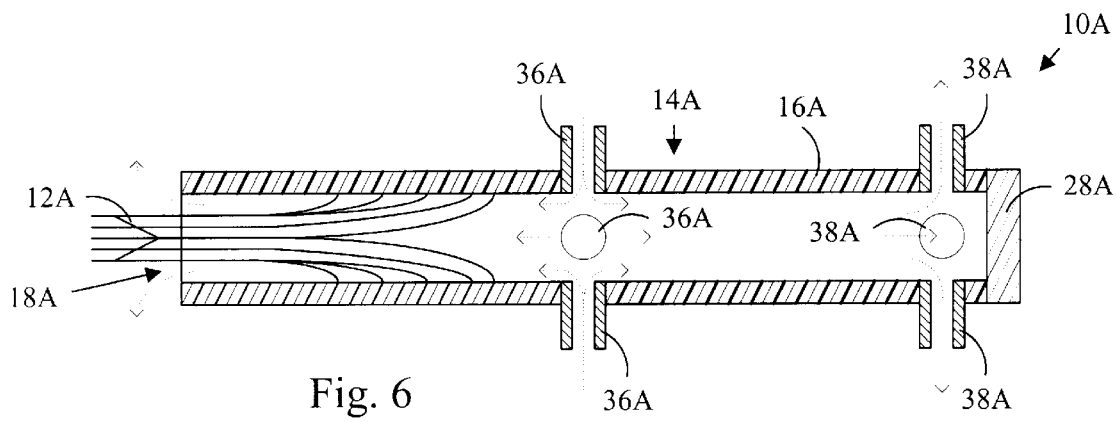
FIG. 6 is a longitudinal cross-sectional view of a self-guiding optical waveguide according to the present invention in a first non-guiding mode.
Figure 7:
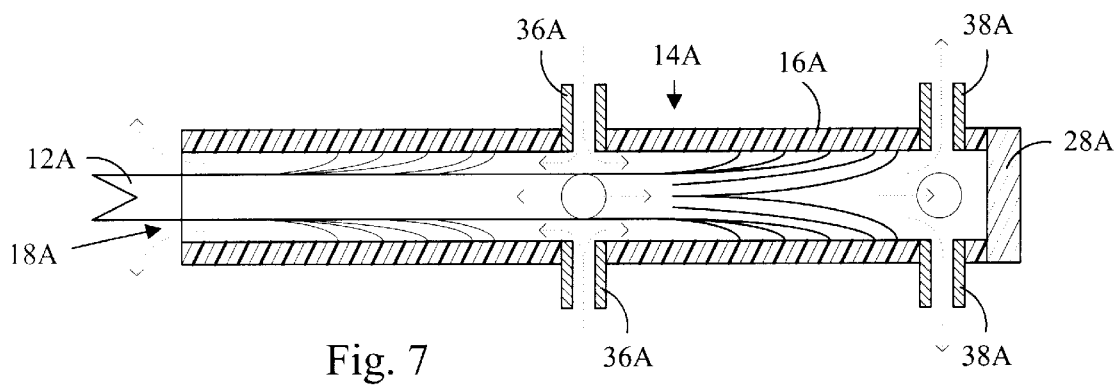
FIG. 7 is a longitudinal cross-sectional view of a self-guiding optical waveguide according to the present invention in a second non-guiding mode.
Figure 8:
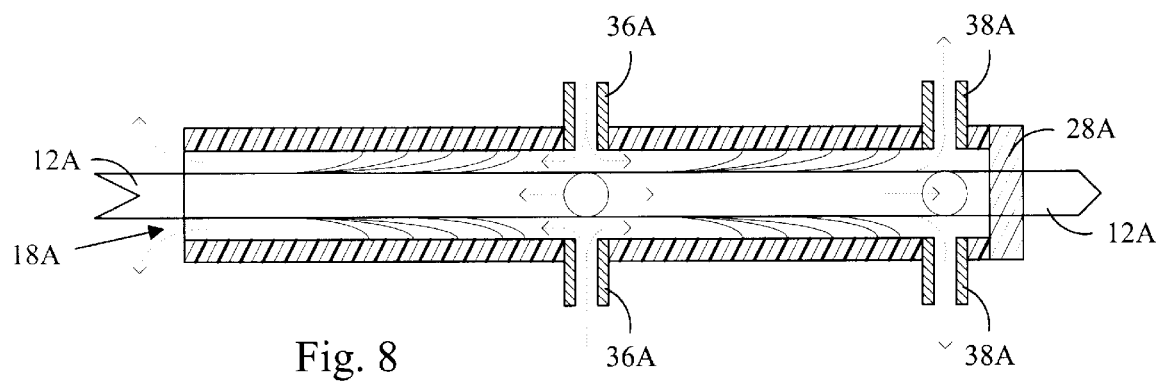
FIG. 8 is a longitudinal cross-sectional view of a self-guiding optical waveguide according to the present invention in a guiding mode.

A self-guiding optical waveguide 10A utilizing the present invention is shown in FIGS. 6 through 8. The self-guiding optical waveguide 10A shown in FIG. 6 through 8 differs from the optical waveguide 10 shown in FIG. 1 in that the self-guiding optical waveguide 10A does not include the heater 30. Instead, the self-guiding optical waveguide 10A uses the energy from a laser beam 12A to create temperature and reflective index gradients in a fluid medium 26A within a channel 18A of a channel member 14A.

Such temperature and refractive index gradients can be created by employing a channel member wall 16A made of an optically absorbent material for the wavelength of the laser beam 12A. Such an absorptive channel member wall 16A absorbs the energy from the laser beam 12A which causes the channel member wall 16A to be heated (FIG. 6). As the laser beam 12A continues to heat the absorptive channel member wall 16A, the channel member wall heats the fluid medium 26A and establishes temperature and refractive index gradients in the fluid medium. The refractive index gradient enables the fluid medium 26A to begin guiding the laser beam 12A which enables the laser beam 12A to heat portions of the channel member wall 16A located closer to a laser output port 38A (FIG. 7). Eventually, the laser beam 12A heats up the entire length of the channel member wall 16A sufficiently to create a refractive index gradient throughout the fluid medium 26A (along the length of the channel member wall 16A), which enables the fluid medium to guide the laser beam 12A entirely through the channel 18A within the channel member 14A (FIG. 8). Like the embodiment shown in FIG. 1, a fluid pump (not shown) preferably is employed to create a laminar flow of the fluid medium 26A between a laser input port 36A and the laser output port 38A in order to maintain the temperature and refractive index gradients that enable the fluid medium to guide the laser beam 12A through the channel member 14A.

The self-guiding optical waveguide 10A can be operated in either of two modes: stable and unstable. In the stable mode, the laser beam 12A is continually guided through the channel member 14A after the refractive index gradient is initially created, as discussed above. The stable mode is obtained by reaching equilibrium between the absorption of the laser beam 12A by the channel member wall 16A and the guiding of the laser beam by the fluid medium 26A. In other words, the channel member wall 16A absorbs a portion of the energy of the laser beam 12A sufficient to maintain the temperature and refractive index gradients that enable the fluid medium 26A to continuously guide the laser beam 12A. Preferably, this is accomplished by employing a multi-mode laser beam in which the higher order modes of the laser beam are used to heat up the channel member wall 16A to create the temperature and refractive index gradients so that the fluid medium 26A can guide the low-order modes of the laser beam 12A through the channel 18A.

The unstable mode exists when the laser beam 12A is alternately guided and not guided by the self-guiding optical waveguide 10A. The unstable mode occurs when the channel member wall 16A heats up through absorption of the laser beam 12A and the resulting temperature and refractive index gradients cause the fluid medium 26A to begin guiding the laser beam 12A through the channel 18A. While the laser beam 12A is being guided, the channel member wall 16A absorbs much less energy from the laser beam 12A, so the channel member cools and the temperature and refractive index gradients needed to guide the laser beam gradually disappear. When the refractive index gradient disappears, the fluid medium 26A stops guiding the laser beam 12A and the channel member wall 16A heats up again from the energy of the laser beam 12A. Such heating and cooling of the channel member wall 16A periodically creates and eliminates the refractive index gradient in the fluid medium 26A. As a result, the output of the laser beam 12A from the channel member 14A oscillates on and off when in the unstable mode.

The self-guiding effect discussed above can be used to help reduce transmission losses when using a bent channel member. Such bends cause the laser beam 12A to heat up the channel member wall 16A faster, which results in a steeper temperature gradient within the fluid medium 26A. The steeper temperature gradient results in a steeper refractive index gradient, which enhances the ability of the fluid medium 26A to guide the laser beam 12A.

It will be appreciated from the foregoing discussion that the present invention provides an optical waveguide for guiding low-power and high-power laser beams. In addition, the optical waveguide of the present invention can be made very inexpensive because the channel member can be composed of inexpensive, commercially available materials, such as metal tubing and plastic hoses. In addition, the optical waveguide of the present invention is much more versatile than prior art optical fibers in that the optical waveguide of the present invention can be operated both as a standard waveguide for guiding a laser beam and as a switch or modulation device that alternately guides and blocks the transmission of a laser beam.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. An optical waveguide system for delivery of a laser beam, comprising:
    a channel member enclosing a channel therewithin, the channel member having a laser input port positioned to receive the laser beam into the channel, and a laser output port positioned to output the laser beam from the channel, the channel member having a wall defining at least a portion of the channel;
    a fluid medium disposed within the channel; and
    a heat source communicating with the channel member and supplying sufficient heat to the fluid medium immediately adjacent the channel member wall to create a transverse temperature gradient in the fluid medium in the channel which produces a refractive index gradient in the fluid medium within the channel that guides the laser beam within the channel from toward the laser input port to toward the laser output port, a portion of the fluid medium immediately adjacent to the channel member wall being hotter than a portion of the fluid medium farther away from the channel member wall.

2. The optical waveguide system of claim 1 wherein the channel member includes first and second fluid input ports and a fluid output port each in communication with the channel to conduct the fluid medium into and out of the channel, respectively, and the optical waveguide system further includes a fluid pump coupled to the fluid input ports, the fluid pump directing a sufficient quantity of the fluid medium into the channel through the fluid input port to cause a sufficient portion of the fluid medium within the channel to exit the channel through the fluid output port to refresh the fluid medium within the channel and maintain the temperature gradient, the fluid input ports being positioned directly opposite each other such that the fluid entering the channel member through the first input port counters the fluid entering the channel member through the second input port and causes the fluid in the channel to flow in a laminar manner.

3. The optical waveguide system of claim 2, further including:
    a fluid controller coupled to the fluid pump and structured to selectively restrict and enable the fluid medium to flow through the fluid input ports and into the channel, the fluid controller selectively restricting the fluid flow sufficiently to reduce the temperature gradient within the channel sufficiently to prevent the fluid medium in the channel from guiding the laser beam within the channel for output through the laser output port and the fluid controller selectively enabling the fluid flow sufficiently to increase the temperature gradient within the channel sufficiently to allow the fluid medium in the channel to guide the laser beam within the channel for output through the laser output port.

4. The optical waveguide system of claim 1 wherein the channel member wall has an interior surface defining the channel, the interior surface being substantially reflective to prevent the channel member wall from being overheated by the laser beam.

5. The optical waveguide system of claim 1 wherein the laser output port includes a window that is substantially transparent to the laser beam.

6. The optical waveguide system of claim 1 wherein the channel member is an elongated cylindrical tube extending at least from the laser input port to the laser output port.

7. The optical waveguide system of claim 1 wherein the heat source is a laser generating the laser beam and the channel member wall has an interior surface that is sufficiently optically absorbent to absorb a sufficient portion of the laser beam striking the interior surface to heat the channel member wall sufficiently to create the temperature gradient and thereby produce the refractive index gradient that enables the fluid medium to guide the laser beam within the channel.

8. The optical waveguide system of claim 7 wherein the laser beam has a low-order mode and high-order modes and the interior surface of the channel member wall is sufficiently optically absorbent to be heated by the high-order modes sufficiently to create the temperature gradient that results in the refractive index gradient that enables the fluid medium to guide the low-order mode of the laser beam.

9. The optical waveguide system of claim 1, further including:

a heating controller coupled to the heat source, the heating controller being operable to selectively cause the heat source to heat the channel member wall and to selectively allow the channel member wall to cool sufficient to reduce the temperature gradient within the channel to prevent the fluid medium from guiding the laser beam within the channel.

10. An optical waveguide for delivery of a laser beam, comprising:

a channel member enclosing a channel, the channel member having a wall, a laser input port for receiving the laser beam from a laser into the channel, and a laser output port for outputting the laser beam from the channel; and a fluid medium disposed within the channel, the fluid medium having a transverse refractive index gradient ranging from a low refractive index immediately adjacent the channel member wall to a high refractive index away from the channel member wall, the refractive index gradient being sufficient to enable the fluid medium to guide the laser beam from the laser input port to the laser output port, wherein the channel member wall has an interior surface that is sufficiently optically absorbent to absorb a sufficient portion of the laser beam striking the interior surface of the channel member wall to heat the channel member wall sufficiently to create a temperature gradient in the fluid medium which produces the refractive index gradient that enables the fluid medium to guide the laser beam.

11. The optical waveguide of claim 10 wherein the channel member includes first and second fluid input ports and a fluid output port each in communication with the fluid medium in the channel, and the optical waveguide further includes:

a fluid pump coupled to the fluid input ports, the fluid pump directing a sufficient quantity of fluid medium into the channel through the fluid input ports to cause a sufficient portion of the fluid medium within the channel to exit the channel through the fluid output port to refresh the fluid medium to maintain the temperature gradient, the fluid input ports being positioned directly opposite each other such that the fluid entering the channel member through the first input port counters the fluid entering the channel member through the second input port and causes the fluid in the channel to flow in a laminar manner.

12. The optical waveguide of claim 11, further including:

a fluid controller coupled to the fluid pump, the fluid controller being structured to alternately restrict and enable the fluid medium to flow through the fluid input ports into the channel to alternately prevent and enable the fluid medium to guide the laser beam to the laser output port, the fluid controller being structured to restrict the fluid flow sufficiently to reduce the refractive index gradient within the channel sufficiently to prevent the fluid medium in the channel from guiding the laser beam to the laser output port and the fluid controller being structured to enable the fluid flow sufficiently to increase the refractive index gradient within the channel sufficiently to enable the fluid medium in the channel to guide the laser beam to the laser output port.

13. The optical waveguide of claim 10 wherein the laser output port includes a window that is substantially transparent to the laser beam.

14. The optical waveguide of claim 10 wherein the channel member is an elongated cylindrical tube extending from the laser input port to the laser output port.

15. The optical waveguide of claim 10 wherein the laser beam has a low-order mode and high-order modes, the channel member has a cross-sectional diameter sized to contact the high-order modes without contacting the low-order mode, and the channel member wall is sufficiently optically absorbent to be heated by the high-order modes sufficiently to create the temperature gradient that results in the refractive index gradient that enables the fluid medium to guide the low-order mode of the laser beam.

16. A method of guiding a laser beam generated by a laser, comprising:

enclosing a fluid medium within a channel member having a wall defining a channel, a first end with a laser input port for receiving the laser beam from the laser into the channel, and a second end with a laser output port for outputting the laser beam from the channel;

establishing a refractive index gradient in the fluid medium within the channel member, wherein a portion of the fluid medium adjacent the channel member wall has a lower refractive index than a portion of the fluid medium farther away from the channel member wall; and directing the laser beam into the input laser port such that the refractive index gradient in the fluid medium enables the fluid medium to guide the laser beam from the input port toward the output port.

17. The method of claim 16 wherein the establishing step includes:

heating the channel member wall sufficiently to create a temperature gradient in the fluid medium in the channel such that the portion of the fluid medium adjacent the channel member wall is hotter than the portion of the fluid medium farther away from the channel member wall, the temperature gradient producing in the refractive index gradient.

18. The method of claim 17 wherein the channel member includes a fluid input port and a fluid output port each in communication with the fluid medium in the channel, the method further including:

directing fluid into the channel through the fluid input port at a sufficient rate to cause a sufficient portion of the fluid medium within the channel to exit the channel through the fluid output port to refresh the fluid medium to maintain the temperature gradient.

19. The method of claim 18, further including:

alternately restricting and enabling the fluid medium to flow through the fluid input port into the channel to alternately prevent and enable the fluid medium to guide the laser beam to the laser output port, the fluid flow being restricted sufficiently to reduce the temperature gradient within the channel sufficiently to prevent the fluid medium in the channel from guiding the laser beam to the laser output port and the fluid flow being enabled sufficiently to increase the temperature gradient within the channel sufficiently to enable the fluid medium in the channel to guide the laser beam to the laser output port.

20. The method of claims 19, further including:

modulating the output of the laser beam from the channel by performing the alternately restricting and enabling steps in a selected sequence such that the laser beam is output alternately from the channel in a selected manner.

21. The method of claim 17, further including:

providing the channel member wall with an interior surface that is optically absorbent; and directing the laser beam against the interior surface of the channel member wall to heat the channel member wall sufficiently to create the temperature gradient and produce the refractive index gradient that enables the fluid medium to guide the laser beam.

22. The method of claim 21 wherein the laser beam has a low-order mode and high-order modes and the directing step includes directing the laser beam through the channel member such that the high-order modes contact and heat the channel member wall sufficiently to create the temperature gradient that results in the refractive index gradient that enables the fluid medium to guide the low-order mode of the laser beam in a stable manner.

23. The method of claim 21 wherein the directing step includes oscillating the laser beam by enabling the channel member wall to cool sufficiently to stop the laser beam from being transmitted until the laser beam heats up the channel member wall again sufficiently to produce the refractive index gradient that enables the fluid medium to guide the laser beam.

* * * * *